May 4, 1926.
J. A. STROMQUIST
1,583,624
GRAIN ELEVATOR
Filed March 23, 1925
2 Sheets-Sheet 1
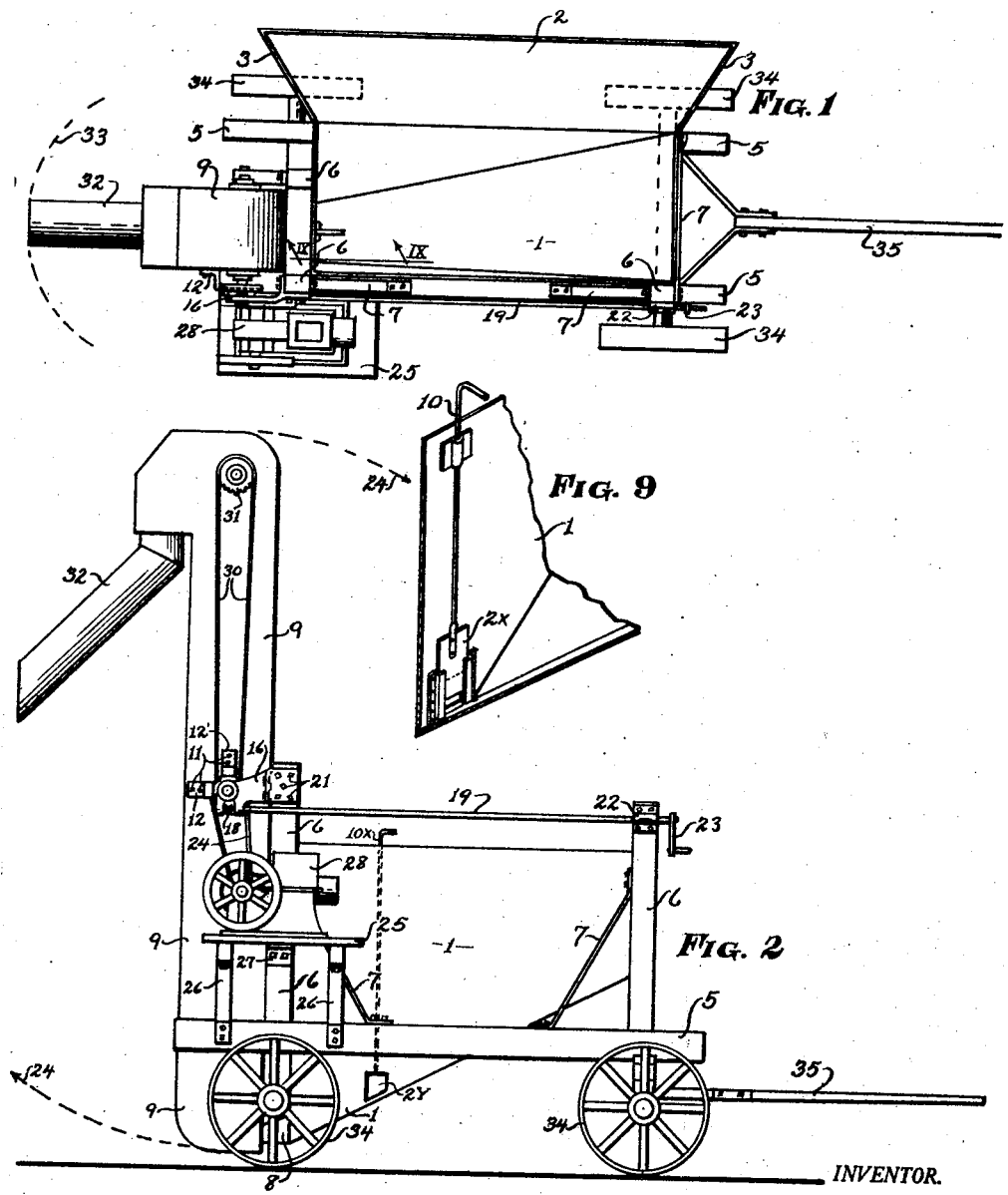
INVENTOR.
BY Joseph A. Stromquist
William C. Edwards Jr
ATTORNEY.

May 4, 1926.

J. A. STROMQUIST 1,583,624

GRAIN ELEVATOR

Filed March 23, 1925    2 Sheets-Sheet 2

INVENTOR.
Joseph A. Stromquist
BY William C. Edwards, Jr.
ATTORNEY.

Patented May 4, 1926.

1,583,624

UNITED STATES PATENT OFFICE.

JOSEPH A. STROMQUIST, OF McPHERSON, KANSAS.

GRAIN ELEVATOR.

Application filed March 23, 1925. Serial No. 17,591.

*To all whom it may concern:*

Be it known that I, JOSEPH A. STROMQUIST, a citizen of the United States, residing at McPherson, in the county of McPherson and State of Kansas, have invented certain new and useful Improvements in a Grain Elevator, of which the following is a description, referring to the accompanying drawings, which form a part of this specification.

My invention refers to a grain elevator of the type commonly used by the farmer for transferring wagon grain into grain bins and the like. My invention embodies, first a truck on wheels, adapted to be moved from one bin or place to another; mounted on the truck is a preferred type of hopper, gas engine or motor, and a swingable elevator housing connecting through spouting for the further allied purposes of the invention.

Figure 5:
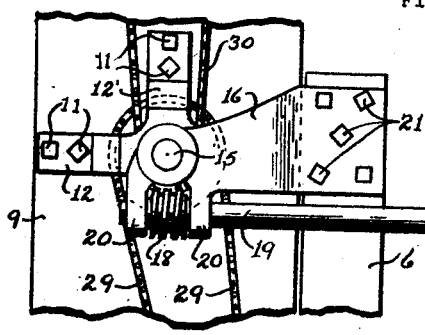
Figure 6:
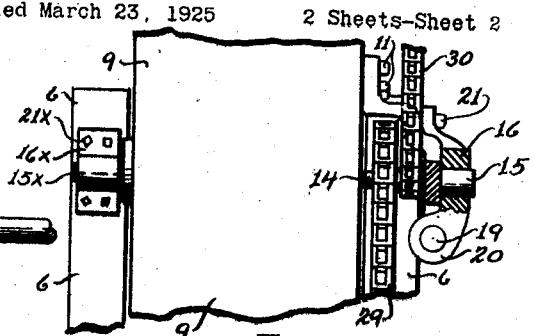
Figures 7, 8:
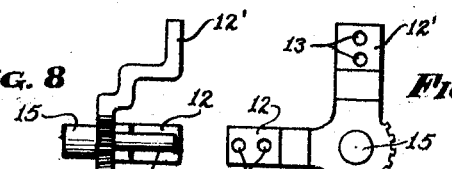
Figure 3:
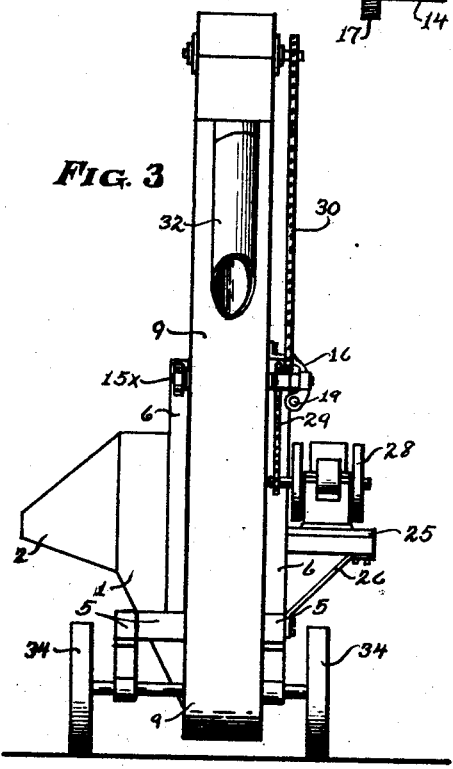
Figure 4:
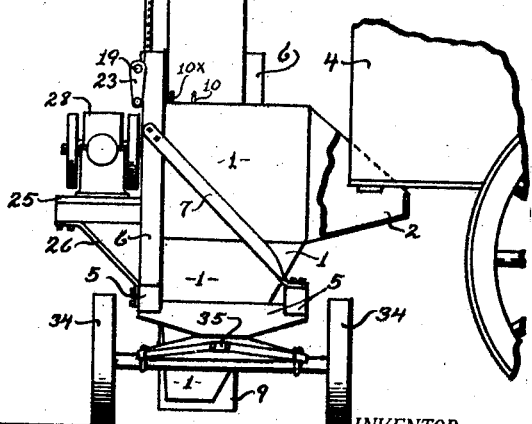

In the drawings, Fig. 1 is a plan view of the portable farm elevator. Fig. 2 is a side elevation of the machine to disclose the engine mounting. Fig. 3 represents a rear view of the machine. Fig. 4 is a front view of the machine and shows the rear fragmentary portion of a grain wagon, ready for unloading. Fig. 5 is a detail side view of the supporting bracket and tilting mechanism, which functions to support the elevator. Fig. 6 represents a rear view of the parts disclosed in Fig. 5. Fig. 7 is a detail view of the bracket which is fastened to and supports the elevator. Fig. 8 is a side view of the parts seen in Fig. 7. Fig. 9 is a sectional view in perspective, taken along the line $1^x$—$1^x$, Fig. 1 and looking in the direction of the arrows, to show the valve mechanism. Similar numerals of reference indicate corresponding parts throughout all the figures of the drawings.

Referring to the drawings, mounted on the truck, Fig. 2 is shown the tank 1, whose sides and bottom all slope and converge at the valve, $2^x$ Fig. 9. The tank 1 projects toward and beneath the wagon, Fig. 4 and has its ends flared as seen at 3, 3 Fig. 1. The wagon box 4 has been backed up so that it extends over the part 2 of the tank. The grain, on removal of the end gates, tends to run into the hopper 1, with little scooping required.

Mounted on the frame 5 of the truck and between the standards 6, rigidly braced as at 7, 7 is seen the tank 1. At 8, Fig. 2 is shown a spout leading from the valve opening $2^x$, Fig. 9, into and connecting with the boot of the grain elevator 9. Opening or closing the valve mechanism, is accomplished by raising or lowering the rod 10, as will be readily understood. A similar valve opening $2^y$ with rod connection $10^x$ may be used to assist the parts $2^x$ and 10.

The elevator 9 is adapted to tilt on bearings carried by supports 6, 6 of the frame, or along the dotted arcs 24, 24 Fig. 2. This is a desirable function of my invention since it enables the farmer to house the machinery between seasons in a shed having a very low roof, or to otherwise store it. The elevator 9 carries a spider shaped bracket, detailed in Figs. 7 and 8, provided with two leg members 12 and 12'. Holes 13 in said legs receive the lag screws or bolts 11 for rigid anchoring purposes. The bracket is provided with a shaft 14, which in Fig. 6 is shown carrying two sprockets, of varying diameter, rigidly connected to one another, for purposes later explained. Axially aligned with the shaft 14 but on the opposite side from shaft 14 is shown a spindle 15. This spindle 15 is pivotally mounted in the bracket 16, said bracket being secured to a standard 6 by the bolts 21. It will be noted that a small bracket $16^x$ is secured by bolt $21^x$ to the opposite standard 6 and pivotally houses a stub spindle $15^x$ rigidly affixed to the elevator 9 on the side opposite bracket 16. The elevator 9 tilts on its pivots 15, $15^x$.

Referring to Fig. 2 a shaft 19 turned by a crank 23 is housed in bearings 20, 20 and 22. The shaft 19 carries a worm 18 which is in mesh with teeth 17 on the bracket Fig. 7. Thus turning the crank 23 operates through the shaft 19 to cause the worm 18 to rotate the bracket and thus pivot the elevator 9.

At 25 is a platform supported on braces 26 and fastened to the standard 6 by the steel bracket 27. On the platform 25 is mounted the engine 28, which serves to drive a chain 29 which travels over the larger sprocket on the spindle 14. At 30 is another chain which travels over the smaller sprocket mounted on spindle 14, and drives the sprocket 31 which turns the usual elevator chains and therefore elevates the buckets in the well understood manner, to dump the grain elevated into any type of spouting 32 for obvious purposes. The wheels 34 support the frame 5 of the machine and the truck has a tongue 35.

Such modifications may be employed as lie within the scope of the appended claims.

Having fully disclosed my invention what I now claim as new and desire to secure by Letters Patent is:

1. A spider bracket for pivotally supporting a grain elevator housing, comprising leg elements projecting from a central hub portion carrying two axially aligned spindles on opposite sides of said hub, and teeth formed on a portion of said hub element.

2. A grain elevator including a truck element, a tank mounted thereon, whose sides and bottom all slope and converge at a valve at one end of the truck; elevator mechanism, supports carried by the truck, brackets thereon, shafts carried by said brackets; a spider bracket on the side of the elevator mechanism including leg elements projecting from a central hub portion carrying axially aligned spindles on opposite sides of said hub, and teeth formed on a portion of said hub element; spindles mounted on the first brackets, axially aligned with the axle element of the spider bracket; said elevator mechanism being swingable so that the boot of the elevator may be brought contiguous the valve opening of the tank, or be swung away from such position as desired.

JOSEPH A. STROMQUIST.